US007286130B2

(12) United States Patent
Iguchi et al.

(10) Patent No.: US 7,286,130 B2
(45) Date of Patent: Oct. 23, 2007

(54) POLYGONAL CHART DRAWING PROCESSING METHOD, DEVICE AND COMPUTER-READABLE MEDIUM RECORDING A PROGRAM OF THE SAME

(75) Inventors: Masayuki Iguchi, Kawasaki (JP); Masao Ezawa, Kawasaki (JP); Tadashi Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 23 days.

(21) Appl. No.: 11/288,365

(22) Filed: Nov. 29, 2005

(65) Prior Publication Data
US 2007/0046675 A1    Mar. 1, 2007

(30) Foreign Application Priority Data
Aug. 31, 2005 (JP) .............................. 2005-250415

(51) Int. Cl.
*G06T 11/20* (2006.01)
(52) U.S. Cl. ..................................... 345/440; 345/441
(58) Field of Classification Search ................ 345/440, 345/441
See application file for complete search history.

(56) References Cited

U.S. PATENT DOCUMENTS

| | | | | |
|---|---|---|---|---|
| 4,675,147 A | * | 6/1987 | Schaefer et al. ............ 376/245 |
| 5,408,596 A | * | 4/1995 | Nonaka et al. ............. 345/440 |
| 6,211,887 B1 | * | 4/2001 | Meier et al. ................. 345/440 |
| 2005/0209780 A1 | * | 9/2005 | Matsuda et al. ................ 702/2 |
| 2006/0061589 A1 | * | 3/2006 | Suyama et al. ............. 345/606 |

FOREIGN PATENT DOCUMENTS

JP    2002-197250    7/2002

\* cited by examiner

*Primary Examiner*—Kee M. Tung
*Assistant Examiner*—Motilewa Good-Johnson
(74) *Attorney, Agent, or Firm*—Staas & Halsey LLP

(57) ABSTRACT

The polygonal chart drawing processing device inputs information including the number N of evaluation items, the length M of an evaluation axis, evaluation items and values for the drawing object from the radar chart drawing processing device. The device generates base graphics (e.g. isosceles triangle) as many as the number of evaluation items, then, by obtaining the length L of an isosceles side of the similar figure to the base graphic, generates an item-value-corresponding graphic having a vertical angle being 2π/N and an area representing an item value of the corresponding evaluation item. The device then draws a polygonal chart which consists of all the item-value-corresponding graphics arranged in a radial pattern with the indicator axis of a radar chart being placed over a center line of the corresponding item-value-corresponding graphic and the vertical angle of the item-value-corresponding graphic being placed over the center point.

9 Claims, 10 Drawing Sheets

| EVALUATION ITEM | SCORE | AREA |
|---|---|---|
| A | 3 | 3.18 |
| B | 3 | 3.18 |
| C | 3 | 3.18 |
| D | 3 | 3.18 |
| E | 3 | 3.18 |
| F | 3 | 3.18 |
| G | 3 | 3.18 |
| H | 3 | 3.18 |
| TOTAL | 24 | 25.46 |
FIG.2A
| EVALUATION ITEM | SCORE | AREA |
|---|---|---|
| A | 4.5 | 2.39 |
| B | 1.5 | 1.86 |
| C | 3.5 | 1.24 |
| D | 1 | 1.59 |
| E | 4.5 | 3.18 |
| F | 2 | 2.83 |
| G | 4 | 5.66 |
| H | 4 | 6.36 |
| TOTAL | 25 | 25.10 |
FIG.2B
| EVALUATION ITEM | SCORE | AREA |
|---|---|---|
| A | 5 | 1.77 |
| B | 1 | 1.77 |
| C | 5 | 0.88 |
| D | 0.5 | 0.88 |
| E | 5 | 0.88 |
| F | 0.5 | 0.88 |
| G | 5 | 7.95 |
| H | 4.5 | 7.95 |
| TOTAL | 26.5 | 22.98 |
FIG.2C
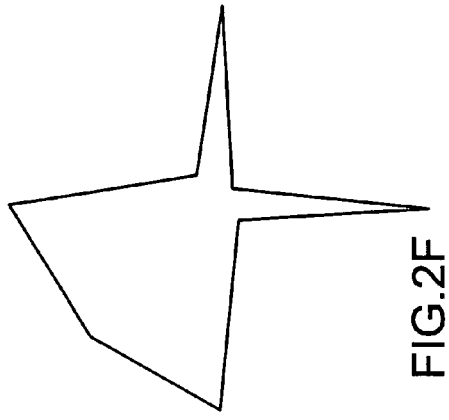
FIG.2D
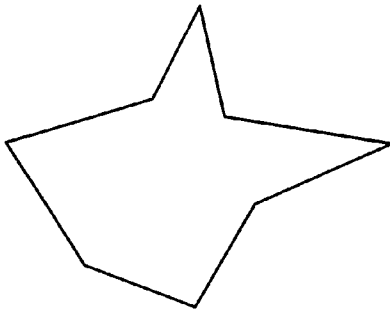
FIG.2E
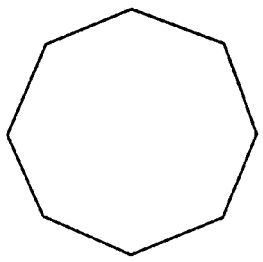
FIG.2F

|  | OBJECT a | OBJECT b | OBJECT c |
|---|---|---|---|
| TOTAL SCORE | THIRD | SECOND | FIRST |
| AREA | FIRST | SECOND | THIRD |
| VISUAL SIZE | THIRD | FIRST OR SECOND | FIRST OR SECOND |

INCORRECT DETERMINATION IN AREA

INCORRECT DETERMINATION IN VISUAL SIZE

FIG.3

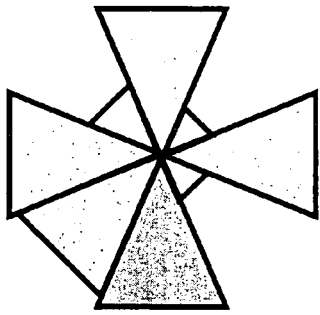
FIG.9A  FIG.9B  FIG.9C
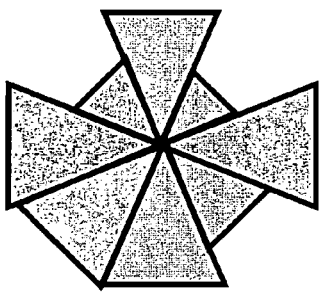
| EVALUATION ITEM | AREA | ONE SIDE |
|---|---|---|
| A | 3 | 2.91 |
| B | 3 | 2.91 |
| C | 3 | 2.91 |
| D | 3 | 2.91 |
| E | 3 | 2.91 |
| F | 3 | 2.91 |
| G | 3 | 2.91 |
| H | 3 | 2.91 |
| TOTAL | 24 | |
FIG.9D
| EVALUATION ITEM | AREA | ONE SIDE |
|---|---|---|
| A | 4.5 | 3.57 |
| B | 1.5 | 2.06 |
| C | 3.5 | 3.15 |
| D | 1 | 1.68 |
| E | 4.5 | 3.57 |
| F | 2 | 2.38 |
| G | 4 | 3.36 |
| H | 4 | 3.36 |
| TOTAL | 25 | |
FIG.9E
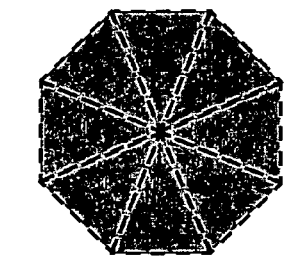
| EVALUATION ITEM | AREA | ONE SIDE |
|---|---|---|
| A | 5 | 3.76 |
| B | 1 | 1.68 |
| C | 5 | 3.76 |
| D | 0.5 | 1.19 |
| E | 5 | 3.76 |
| F | 0.5 | 1.19 |
| G | 5 | 3.76 |
| H | 4.5 | 3.57 |
| TOTAL | 26.5 | |
FIG.9F

|  | OBJECT a | OBJECT b | OBJECT c |
| --- | --- | --- | --- |
| TOTAL SCORE / AREA | THIRD | SECOND | FIRST |
| VISUAL SIZE | THIRD | FIRST OR SECOND | FIRST OR SECOND |

} NO GAP

FIG.10

POLYGONAL CHART DRAWING PROCESSING METHOD, DEVICE AND COMPUTER-READABLE MEDIUM RECORDING A PROGRAM OF THE SAME

CROSS-REFERENCE TO RELATED APPLICATIONS

This application claims priority from Japanese patent application Ser. no. 2005-250415 filed Aug. 31, 2005, the contents of which are incorporated by reference herein.

BACKGROUND OF THE INVENTION

1. Field of the Invention

This invention relates to a chart drawing processing method and device, and computer-readable medium recording a program of the same. More specifically, the present invention relates to a processing method and device for drawing a polygonal chart using polygon by computer, and a computer-readable medium storing a program for causing a computer to function as the processing device.

2. Description of the Related Art

Analyzing techniques using a radar chart include a determination technique of calculating areas of graphics, each of which is made by drawing lines between the scores plotted on indicator axes for evaluation items on the radar chart (hereinafter referred to as "radar chart graphic"), and simply comparing the areas to put an object with a bigger area before the others.

For example, a determination technique using a radar chart described in Patent Document 1 determines superiority and inferiority of determination objects by displaying two radar charts of the determination objects side by side, calculating areas of the two radar chart graphics, and comparing the area of base graphic calculated in predetermined procedure with the calculated area of the radar chart.

(Patent Document 1: Japanese Patent Laid-Open No. 2002-197250)

In such an analyzing technique using a radar chart, however, areas of a radar chart graphic representing objects to be determined or evaluated may not accurately reflect the total scores of evaluation for the objects.

Some physical relationship between scores plotted on indicator axes of radar charts forming a radar chart graphic may lead an error in intuitive determination on sizes of areas of the radar chart graphic.

With reference to FIGS. 1 to 3, an erroneous evaluation occurred when evaluation objects represented on radar charts are evaluated by using areas of the radar chart graphic.

FIG. 1 is a diagram showing an example of a display of a radar chart. A radar chart shown in FIG. 1 is based on a radar chart with an evaluation scale of 0-5 on an indicator axis of each evaluation item for eight evaluation items (A-H). Radar chart graphics representing three evaluation objects of Object a, Object b and Object c are drawn on the bases of the radar charts.

In a radar chart shown in FIG. 1, it is difficult for a user to recognize what comprehensively the best among the three evaluation objects at a glance. If visual sizes of radar chart graphics for respective objects are intuitively compared, Object b or Object c may be recognized as the best.

Accuracy of this evaluation is verified by using total scores of objects, areas of radar chart graphics and visual sizes of the graphics.

FIG. 2 is a diagram showing examples of data tables and radar chart graphics of three evaluation objects. FIG. 2A is an example of a diagram showing a data table for Object a, FIG. 2B is a diagram showing an example of a data table for Object b, and FIG. 2C is a diagram showing an example of a data table for Object c. In each data table, scores and areas of respective evaluation items, a total score, and an area of a radar chart graphic are recorded. FIG. 2D is a diagram showing an example of a radar chart graphic representing Object a, FIG. 2E is a diagram showing an example of a radar chart graphic representing Object b, and FIG. 2F an example of is a diagram showing a radar chart graphic representing Object c.

FIG. 3 is an example of a table showing ranking of each object in total scores, areas of radar chart graphics, and visual sizes of radar chart graphics. According to the data tables shown in FIG. 2A to FIG. 2C, ranking of objects in the total scores is; the first place=Object c, the second place=Object b, and the third place=Object a. Ranking in areas of the radar chart graphics is; the first place=Object a, the second place=Object b, and the third place=Object c. As mentioned above, according to intuitive evaluation of objects in areas of the radar chart graphics, Object b or Object c are seemingly recognized as the best, thus; the first or second places=Object b or Object c, and the third place=Object a.

As shown in FIG. 3, ranking of the objects are not the same for total scores, areas of radar chart graphics and visual sizes of radar chart graphics. If objects are evaluated for superiority and inferiority based on areas of their radar chart graphics, the ranking of evaluation may be incorrect. Thus, areas of radar chart graphics representing evaluation objects do not accurately correspond to the total scores of the evaluation items.

It is difficult for a user to intuitively determine magnitude relationship between radar chart graphics based on impressions the user got from the sizes of graphics. For objects having similar total scores may be evaluated incorrectly. This is because characteristics in shapes of radar chart graphics are not suitable for comparing areas, and a combination of locations of scores on indicator axes of radar charts may change the user's impression on the size of the graphic.

A conventional evaluation method by using areas of radar chart graphics, for example, a processing method disclosed in Patent Document 1 evaluates evaluation objects only by drawing the evaluation objects on radar charts and simply comparing the areas of the drawn radar chart graphics. Therefore, magnitude relationship with evaluation objects in total scores does not correspond to magnitude relationship with areas of radar chart graphics, which leads incorrect evaluation.

In order to cover ambiguity in such evaluating process by using areas of radar chart graphics, a system exists which enables a user to check total scores of evaluation objects by displaying data tables for scores of evaluation items of evaluation objects as well as radar charts. In such a conventional system, however, final evaluation needs to be done by a user who checks numeric values on the displayed data tables. Thus, a user does not take advantage of convenience of comparison between radar charts.

As such, the conventional arts do not take account of how to accurately reflect total evaluation scores of evaluation objects on areas of radar chart graphics. Accordingly, incorrect evaluation result caused by simple comparison of areas of radar chart graphics for evaluation objects cannot be eliminated. Characteristics in a shape of radar chart graphic also make it difficult for a user to intuitively evaluate superiority and inferiority of radar chart graphics by comparing them.

SUMMARY OF THE INVENTION

An object of the present invention is to provide a new polygonal chart drawing processing method, device and a computer-readable medium storing a program of the same for enabling a computer to draw a new polygonal chart graphic, which accurately reflects scores of evaluation objects on an area of the polygonal chart graphic to be drawn without losing a feature of a radar chart of superiority in visualizing tendencies by inequalities of the base positions on respective indicator axes.

The present invention is a processing method for drawing a new polygonal chart representing a relationship among evaluation values of each evaluation items set for a drawing object, for which at least three evaluation items set, by a polygon made with combination of similar figures to a predetermined base graphic form.

The present invention includes process of inputting evaluation items set for a drawing object and item values for the evaluation items; generating base graphics, each of which is a geometric form having a vertical angle and isosceles sides, as many as number N of the evaluation items and allocating the base graphics to the respective evaluation items; generating similar figures each of which forms a similarity to the base graphic and has an angle of $2\pi/N$ and an area representing an item value of the allocated evaluation item, as item-value-corresponding graphics; and drawing a polygonal chart consisting of all the item-value-corresponding graphics arranged in a radial pattern by placing each of the vertical angles over a starting point of an indicator axis of the allocated evaluation item and placing a bisector of each of the vertical angles over the indicator axis.

In the present invention, a polygonal chart is drawn in a manner below. For example, a drawing object of a radar chart shown in FIG. 1 is assumed as a drawing object of a polygonal chart.

First, items (evaluation items A-H) set for the drawing object and item values for respective items are inputted. For example, data tables of FIG. 2A to FIG. 2C are filled. An isosceles triangle with a vertical angle and isosceles sides is set as a base graphic for each item. The base graphics are generated as many as the number of items of a drawing object N (N=8). Then, a similar figure to a base graphic, which has a vertical angle θ of $2\pi/N$ and an area representing an item value of an allocated evaluation item, is generated as an item-value-corresponding graphic. Then, a polygonal chart consisting of all the item-value-corresponding graphics arranged in a radial pattern by placing each vertical angle over a starting point (zero point) of an indicator axis and placing each bisector of the vertical angle over an indicator axis of an allocated evaluation item.

FIG. 4 is a diagram showing an example of a drawing object of a radar chart of FIG. 1 drawn by polygonal chart.

As shown in FIG. 4, item-value-corresponding graphics allocated to respective items are arranged in radial pattern in a polygonal chart so that a vertical angle of a isosceles triangle of a base graphic is placed over a starting point of an indicator axis of a radar chart and a bisector of the vertical angle is placed over an indicator axis of an allocated evaluation item. In the polygonal chart, an item value of each evaluation item is represented as an area of an allocated item-value-corresponding graphic.

As an item-value-corresponding graphic is a similar figure to the base graphic, the place of the item-value-corresponding graphics' bases can indicate relationship between respective item values. If an item value of an evaluation item is small, the area of item-value-corresponding graphic is also small and the base is drawn near to the starting point (zero point). If an item value of evaluation item is large, the area of item-value-corresponding graphic is also large and the base is drawn near to the periphery.

In this manner, a polygonal chart according to the present invention can reflect magnitude relationship between item values of respective evaluation items on magnitude relationship between areas of base graphics. Only the areas in the polygonal chart according to the present invention can represent total scores of evaluation for evaluation objects, thus, data tables representing actual values for the evaluation objects need not be displayed additionally.

Moreover, relationship between respective item-value-corresponding graphics in the polygonal chart is always corresponding to relationship among scores of allocated evaluation items and displayed by similar figures. Thus, the polygonal chart also has a feature of a radar chart for visualizing tendencies by inequalities of the base position on respective indicator axes of respective evaluation items. In other words, higher the score, closer to the periphery the base of an item-value-corresponding graphic is drawn, so that intuitive evaluation performed as comparing polygonal charts may be performed more easily and accurately than in the conventional arts.

The present invention further includes the processing step of storing base graphics with different shapes of bases or lines of isosceles sides in a graphic data storing unit and obtaining a base graphic selected from the graphic data storing unit by user's designation. With this processing step, the present invention can draw polygonal charts with various shapes in response to user's designation by preparing base graphics with various bases or the like.

The present invention is computer-readable medium recording a program for causing a computer to function as a processing device for implementing the polygonal chart drawing processing method.

The present invention is for causing a computer to function as a processing device including a chart selecting unit for accepting user input for designating either of a radar chart or a polygonal chart as a chart representing the drawing object and a radar chart drawing unit for drawing relationship between respective item values of the evaluation items for the drawing object by radar chart; wherein if the chart selecting unit accepts designation of a polygonal chart, the data input unit inputs evaluation items set for a drawing object and item values of the evaluation items.

The present invention can present magnitude relationship with scores of respective evaluation items or total scores as magnitude relationship with areas of polygonal charts so as to solve a problem of impossibility of performing accurate evaluation in evaluation process by simple comparing between areas of radar chart graphics in analyzing by using a radar chart.

Additionally, the present invention can display charts for enabling tendencies to be visualized by inequalities of the base positions on respective indicator axes for respective items, which is an advantage of a radar chart. Thus, the present invention may improve accuracy of evaluation even in intuitive evaluation performed by visually comparing charts.

In the present invention, the display can be switched between a radar chart and a polygonal chart so that analysis by radar chart can be concurrently used if required.

BRIEF DESCRIPTION OF THE DRAWINGS

FIG. 2A through 2F are diagrams showing examples of data tables and radar chart graphics of evaluation objects;

FIG. 3 is a table showing of an example of evaluation ranking for determination objects in total scores order, areas of radar chart graphics, and visual sizes of radar chart graphics;

FIG. 9A through 9F are diagrams showing example of polygonal chart graphics and areas of evaluation objects; and FIG. 10 is a table showing evaluation ranking of evaluation objects in gross areas of polygonal charts and visual sizes of polygonal charts.

DETAILED DESCRIPTION OF THE PREFERRED EMBODIMENTS

Figure 5:
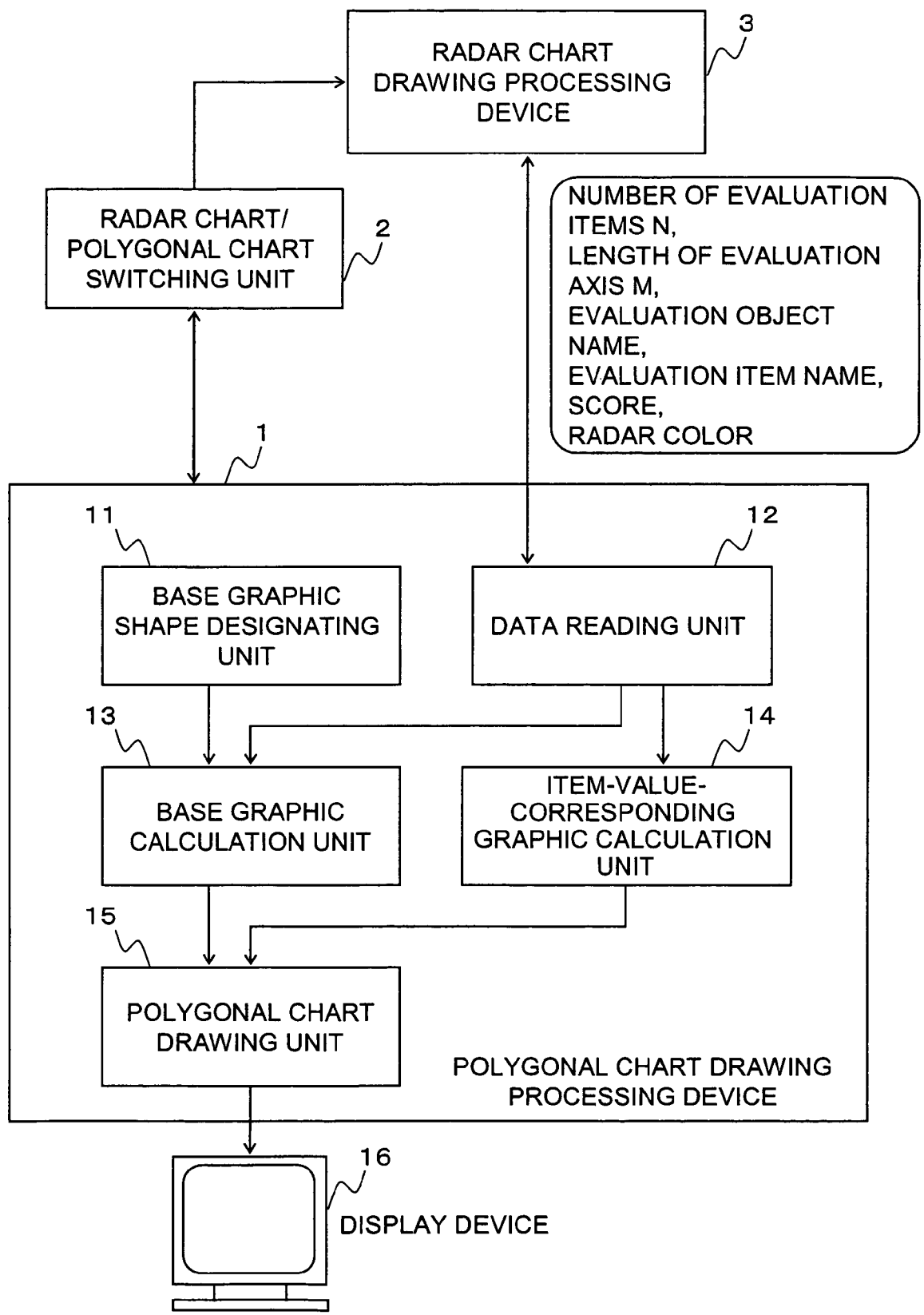
FIG. 5 is a diagram showing an example of a configuration of a polygonal chart drawing processing device.

FIG. 5 is a diagram showing an example of a configuration of a polygonal chart drawing processing device 1 according to the present invention.

The polygonal chart drawing processing device 1 is a processing device for drawing a polygonal chart with combination of similar figures to a base graphic forming a predetermined geometrical form in order to represent a relationship among evaluation values of each evaluation item for drawing objects, for which at least three evaluation items set. The polygonal chart drawing processing device 1 is implemented as a module of a program, which is read in a computer and executed there.

The polygonal chart drawing processing device 1 also sends and receives data or a request to/from a radar chart/polygonal chart switching unit 2 and a radar chart drawing processing device 3 provided in the same computer.

The radar chart/polygonal chart switching unit 2 is a processing unit for accepting user input to designate either of a radar chart or a polygonal chart as a chart for displaying a drawing object and informing the polygonal chart drawing processing device 1 or the radar chart drawing processing device 3 of a request for drawing each chart.

The radar chart drawing processing device 3 is a processing device for drawing a radar chat to represent relationship between respective item values of evaluation items for the drawing object by radar chart.

The polygonal chart drawing processing device 1 includes a base graphic shape designating unit 11, a data reading unit 12, a base graphic calculation unit 13, an item-value-corresponding graphic calculation unit 14, a polygonal chart drawing unit 15 and display device 16.

The base graphic shape designating unit 11 is a processing unit for storing base graphics with different shapes of geometric form with a base or lines of isosceles sides as a base graphic to make the polygonal chart in a graphic storing unit and obtaining information on a base graphic selected by user's designation from the graphic storing unit.

FIG. 6 is a diagram showing examples of a base graphic shape. As shown in FIG. 6A, a base graphic is a graphic AOB, where a vertical angle θ is an angle made by lines AOB and the side AO and the side BO have the same length. The base AB of the graphic AOB may not be a straight line and may be an arc as in FIG. 6B or an arc back as in FIG. 6C. The base AB may also consist of lines as in FIG. 6D. The base AB may also be in a shape, in which two sides of the side AO and the side BO are vertical to the base AB, as in FIG. 6E. The base graphic in the shape of FIG. 6E is called "pentagon".

The data reading unit 12 is a processing unit for inputting information on a drawing object from the radar chart drawing processing device 3. The data reading unit 12 inputs information including an evaluation object name indicating a drawing object, a radar color when a radar chart is being drawn, and an evaluation item name and the score (item value) as a data table as shown in FIGS. 2A to 2C.

The data reading unit 12 also inputs the number of evaluation items N and the length of an evaluation axis of a radar chart M from the radar chart drawing processing device 3. The number of evaluation items N and the length of an evaluation axis of a radar chart M may be previously inputted in conjunction with drawing process at the radar chart drawing processing device 3.

The base graphic calculation unit 13 is a processing unit for generating base graphics as many as the number of evaluation items N and allocating the base graphics to respective evaluation items. Specifically, the base graphic calculation unit 13 generates base graphics by calculating the vertical angle θ by $2\pi/N$ based on the number of evaluation items N and determining a value of each side of isosceles sides (side AO and side BO) by using the length of the indicator axis of a radar chart.

The item-value-corresponding graphic calculation unit 14 is a processing unit for generating a similar figure to a base graphic, which has a vertical angle θ being $2\pi/N$ and an area representing an item value of an allocated evaluation item as an item-value-corresponding graphic.

Specifically, the item-value-corresponding graphic calculation unit 14 generates a similar figure to a base graphic, which has a vertical angle θ being $2\pi/N$ and an area representing an item value of an allocated evaluation item, and obtains the length L of an isosceles side of the similar figure. Where an item value of an evaluation item is P, the length L is obtained by the formula below:

$$L=\sqrt{(2P/\sin(2\pi/N))}$$

Figure 6A:
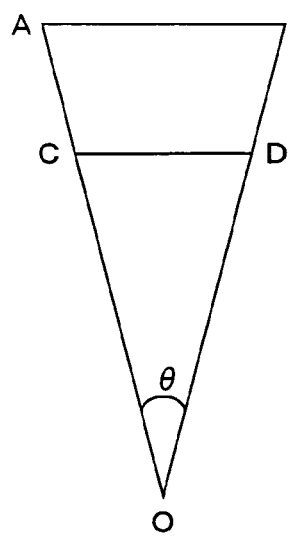
FIG. 6A through 6E are diagrams showing examples of a base graphic shape.
Figure 6B:
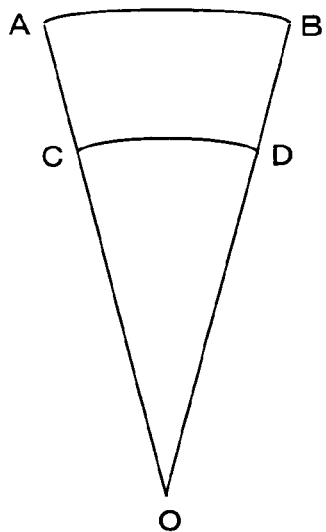
Figure 6C:
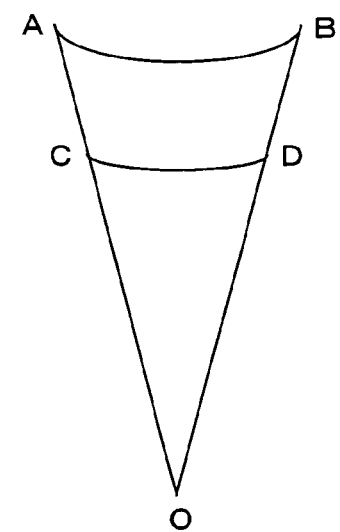
Figure 6D:
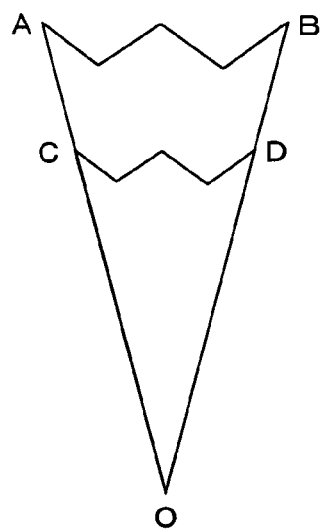
Figure 6E:
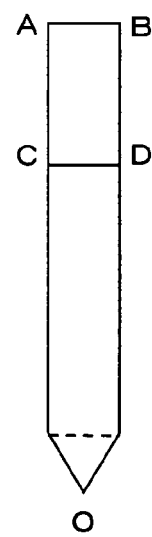

Assuming that the isosceles triangle of FIG. 6A is used as a base graphic, the length of isosceles sides of a similar figure COD to the base graphic AOB is the length of the side CO or the length of the side DO of the similar figure COD to the base graphic AOB.

The item-value-corresponding graphic calculation unit 14 can use any known formulas if only the formula is a method for calculating the length of an isosceles sides of a base graphic from the area and the vertical angle of the base graphic.

The polygonal chart drawing unit 15 is a processing unit for drawing a polygonal chart consisting of all the item-value-corresponding graphics arranged in a radial pattern by placing each vertical angle O over a starting point of an indicator axis of an allocated evaluation item and a bisector of the vertical angle θ over the indicator axis.

Specifically, the polygonal chart drawing unit 15 generates a polygonal chart consisting of all the item-value-corresponding graphics arranged in a radial pattern by using an indicator axis of an evaluation item of a radar chart and placing each vertical angle O of the item-value-corresponding graphic (graphic COD) over a starting point (zero point) of an indicator axis of an evaluation item and placing a bisector of the vertical angle θ over an indicator axis of an allocated evaluation item. Then the polygonal chart drawing unit 15 draws all the item-value-corresponding graphics in a display area of the display device 16 with the same pattern or by same color (for example, by the designated color for drawing color of a radar chart). Alternatively, the polygonal chart drawing unit 15 arranges all the item-value-corresponding graphics and draws their bases and the lines between corner points of the bases by the same color (for example, by the designated radar color).

A flow of processing of the present invention will be described below:

In the embodiment, the polygonal chart drawing processing device 1 performs in response to switching of the chart display between the polygonal chart drawing processing device 1 and the radar chart drawing processing device 3.

Figure 1:
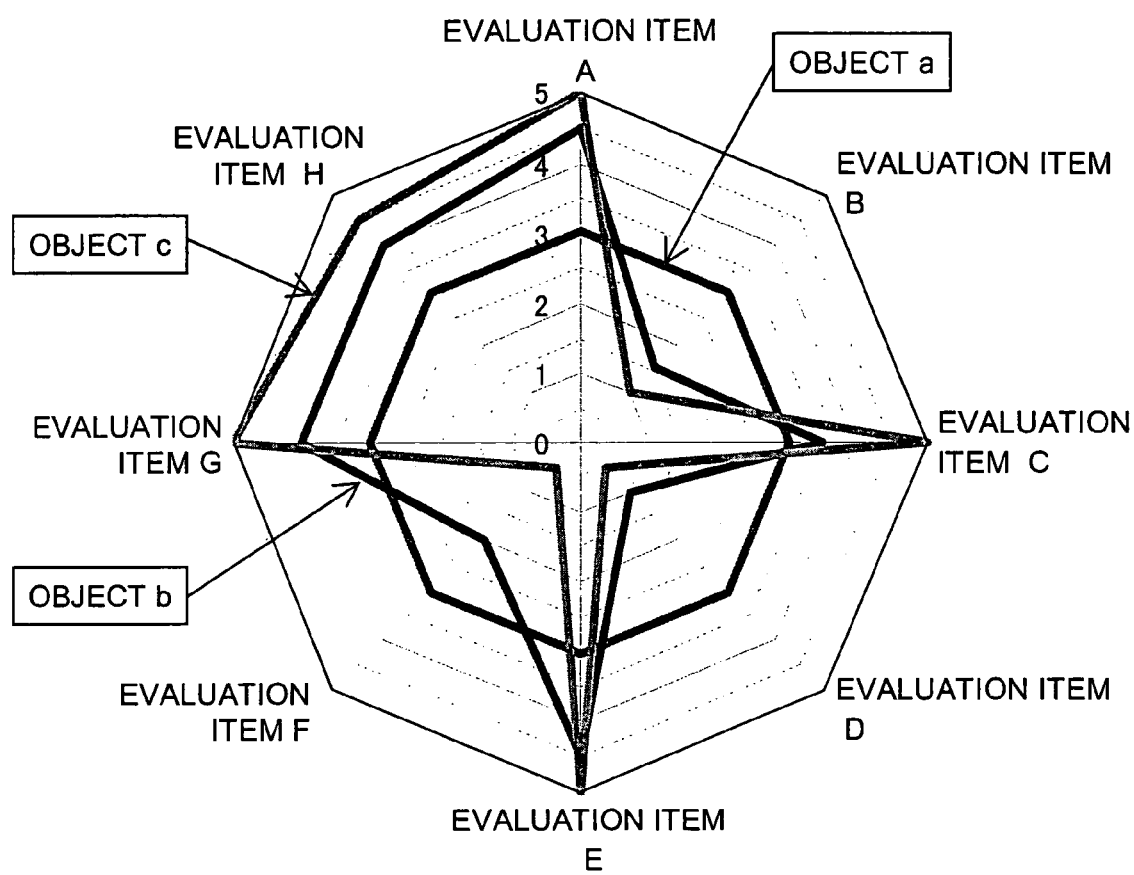
FIG. 1 is a diagram showing an example of a display of a radar chart.
Figure 7:
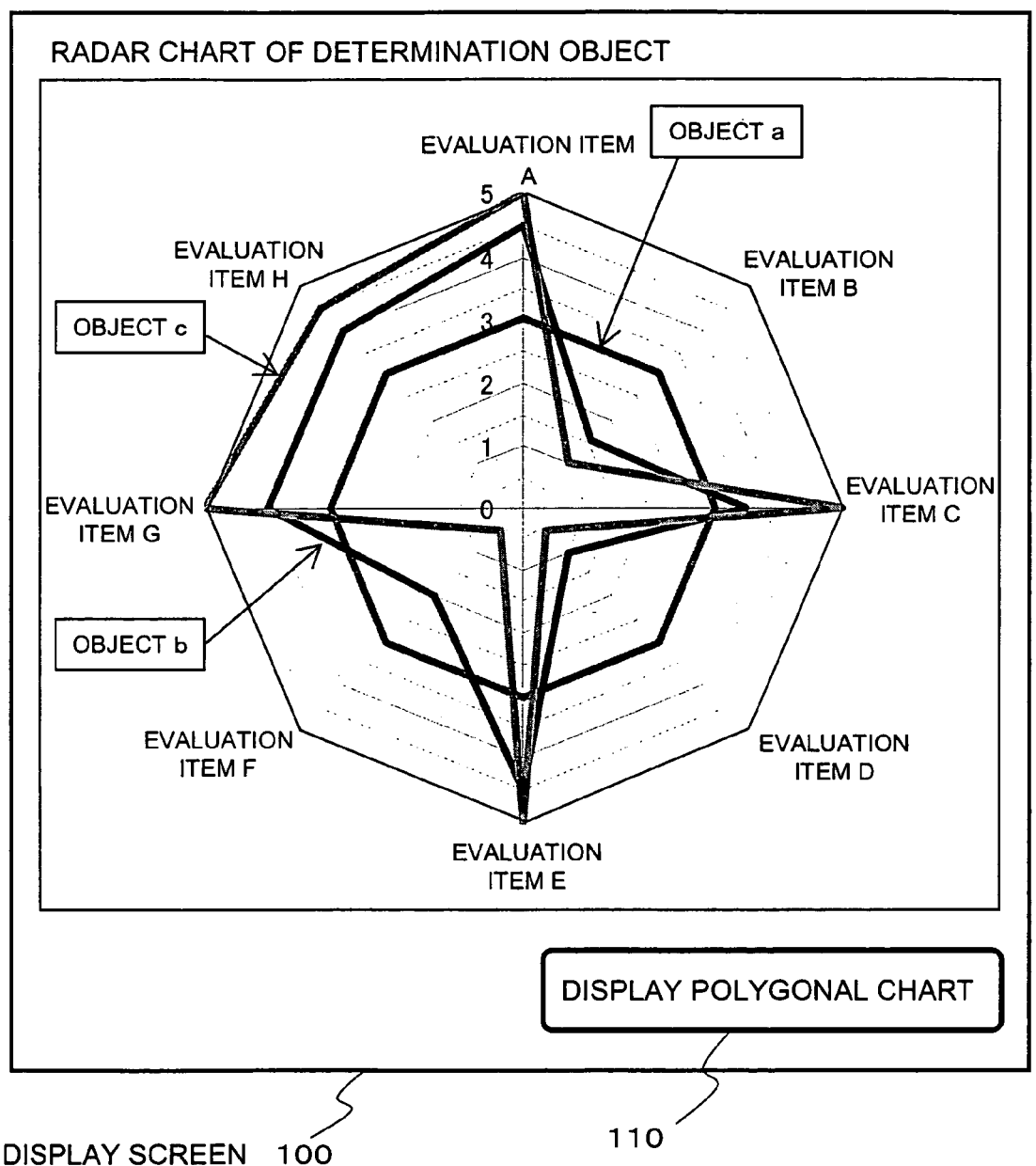
FIG. 7 is a diagram showing an example of a display screen of a radar chart for evaluation objects.

If the radar chart shown in FIG. 1 is drawn by the radar chart drawing processing device 3 and a user selects "Display Polygonal Chart" button 110 on a display device 100 shown in FIG. 7 to indicate to display a polygonal chart, the polygonal chart drawing processing device 1 accepts a request for drawing a polygonal chart from the radar chart/polygonal chart switching unit 2 and starts the process.

Figure 8:
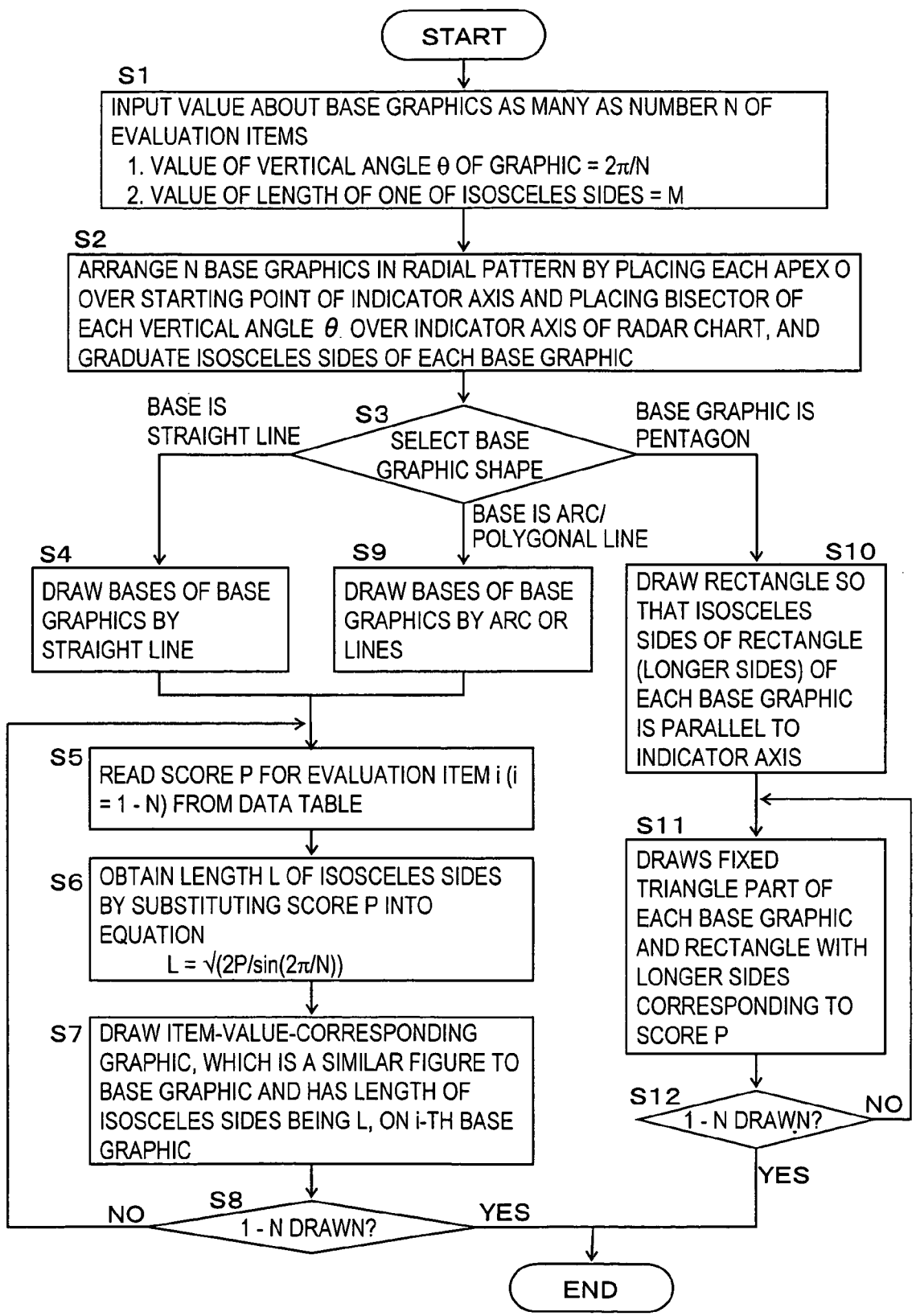
FIG. 8 is a diagram showing a flow of process performed by the polygonal chart drawing processing device.

FIG. 8 is a diagram showing a flow of process performed by the polygonal chart drawing processing device 1.

When the data reading unit 12 inputs a data table of an evaluation object to be drawn from the radar chart drawing processing device 3, the base graphic calculation unit 13 inputs the number N of evaluation items and the length M of an evaluation axis of a radar chart and further inputs the vertical angle θ=2π/N and the length of one of the isosceles sides=M as a value about the base graphic (step S1).

The base graphic calculation unit 13 arranges N base graphics in a radial pattern by placing each apex O over a starting point of an indicator axis of a radar chart and placing a bisector of each vertical angle θ over an indicator axis of an allocated evaluation item and set the scale to isosceles sides of each base graphic (step S2).

When the user indicates a shape of the base graphic, the base graphic shape designating unit 11 informs the base graphic calculation unit 13 of information on the indicated base graphic. If the base of the indicated base graphic is a straight line (step S3), the base graphic calculation unit 13 draws bases of the base graphics by straight line (step S4).

The item-value-corresponding graphic calculation unit 14 reads a score P for the i-th evaluation item (i=1-N) from the data table (step S5) and obtains the length L of the isosceles sides of the base graphic by substituting the evaluation value, namely the score P into a predetermined equation (step S6). Then the item-value-corresponding graphic calculation unit 14 draws an item-value-corresponding graphic, which is a similar figure to the base graphic and has a vertical angle θ and the length of the isosceles sides being L, on a base graphic allocated to the i-th evaluation item (step S7).

The polygonal chart drawing processing device 1 determines whether graphics have been drawn for evaluation items 1-N or not (step S8). If graphics have not been drawn for evaluation items 1-N (NO at step S8), operation returns to the process of step S5. If graphics have been drawn for evaluation items 1-N (YES at step S8), the process ends here.

If the base of the indicated base graphic is an arc or polygonal line at the process of step S3 (step S3), the base graphic calculation unit 13 draws bases of the base graphics by arc or lines (step S9). After this process, the processes of steps S5-S8 are carried on.

If the base of the indicated base graphic is a pentagon at the process at step S3 (step S3), the base graphic calculation unit 13 draws a rectangle so that longer sides with the same length of a rectangle of each base graphic is parallel to an indicator axis of the radar chart (step S10). Then, the base graphic calculation unit 13 draws a fixed triangle unit of each base graphic and a rectangle with longer sides corresponding to the score P (step S11).

The polygonal chart drawing processing device 1 determines whether graphics have been drawn for evaluation items 1-N or not (step S12). If graphics have not been drawn for evaluation items 1-N (NO at step S12), operation returns to the process of step S11. If graphics have been drawn for evaluation items 1-N (YES at step S12), the process ends here.

Figure 4:
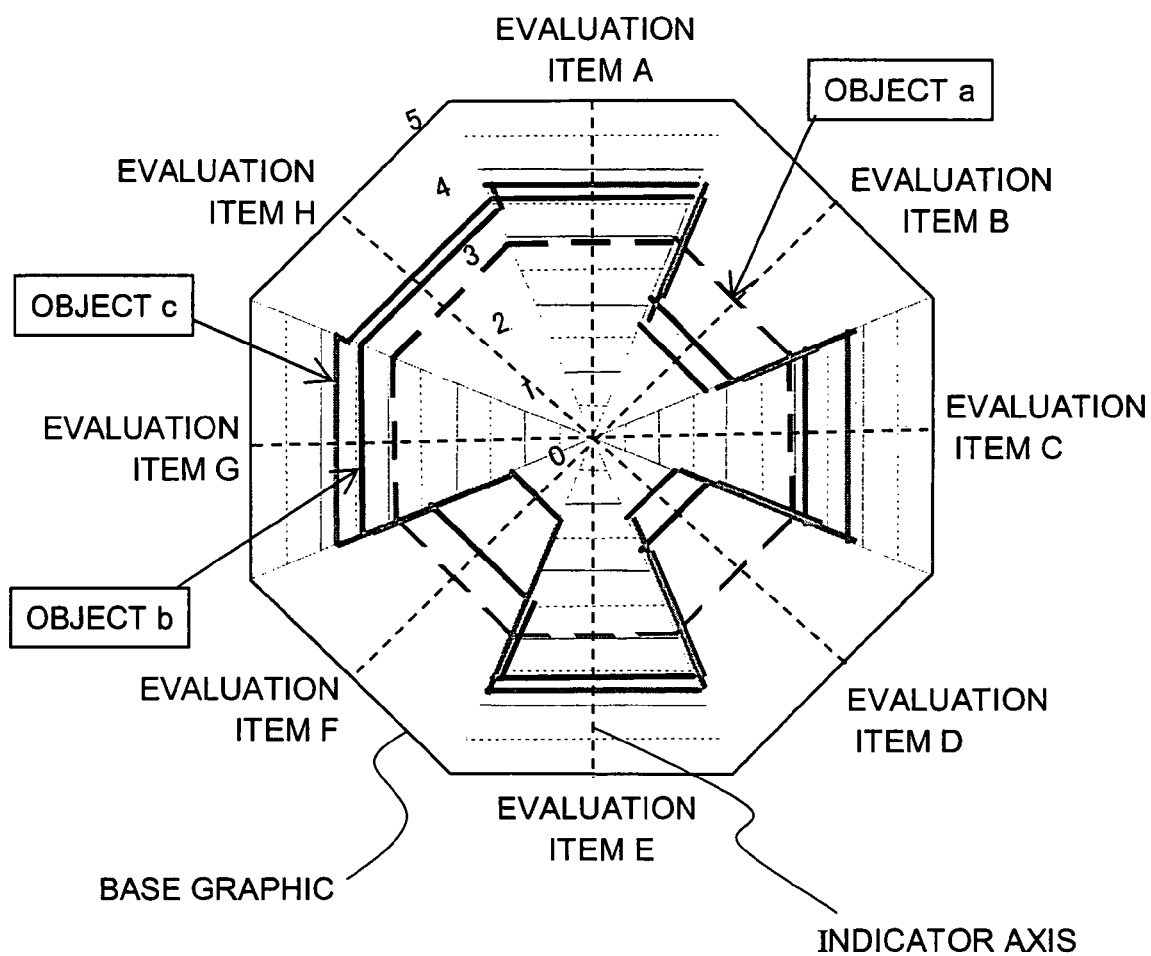
FIG. 4 is a diagram showing an example of a drawing object of a radar chart of FIG. 1 drawn by polygonal chart.

The evaluation objects displayed on a radar chart shown in FIG. 1 can also be displayed by polygonal chart shown in FIG. 4 through the abovementioned process.

FIG. 9 is a diagram showing examples of polygonal chart graphics of three evaluation objects and areas of the polygonal chart graphics.

FIG. 9A is an example of a polygonal chart for Object a, FIG. 9B is an example of a polygonal chart for Object b, and FIG. 9C is an example of a polygonal chart for Object c. FIG. 9D is an example of a data table indicating areas in the polygonal chart for Object a, FIG. 9E is an example of a data table indicating areas in the polygonal chart for Object b, and FIG. 9F is an example of a data table indicating areas in the polygonal chart for Object c. In the data table, areas of item-value-corresponding graphic for evaluation items, length of isosceles sides and a gross area of a polygonal chart, which is a total of the areas of the item-value-corresponding graphics, calculated at the item-value-corresponding graphic calculation unit 14.

As shown in FIG. 10, the order in areas of polygonal charts for objects shown in FIG. 9A through FIG. 9C is almost corresponding to the ranking in visual sizes of the polygonal chart graphics. As such, the area of a drawn polygonal chart for the evaluation object represents the total of evaluation scores and the area of a polygonal chart is corresponding to the visual size of the graphic. In this manner, the present invention narrows a determination gap between the intuitive determination and the determination based on actual total scores and reduces the occurrence of incorrect determination when a user determines objects intuitively by viewing a polygonal chart.

The present invention has been described by the embodiment, though, it is a matter of course that various modifications may be made within the scope of the spirit of the present invention.

For example, the polygonal chart drawing processing device 1 and the radar chart drawing processing device 3 may draw respective charts in the same display area in the display device 16 to display a polygonal chart and a radar chart concurrently by superimposing one of the charts on the other.

Although the present invention has been described as what implements a processing program read and executed by a computer, the processing program for implementing the present invention can be stored in an appropriate storage medium, such as a computer-readable portable medium memory, semiconductor memory and a hard disk, and provided on such a storage medium, or provided by sending/receiving via various communication networks over a communication interface.

What is claimed is:

1. A polygonal chart drawing processing method for drawing a polygonal chart representing relationship among evaluation values of each evaluation item for drawing objects, for which at least three evaluation items set, the method comprising:
   inputting evaluation items set for a drawing object and item values for the evaluation items;
   generating base graphics, each of the basic graphics has a vertical angle allocated based on the number of the evaluation items N at a vertex overlapped at the center point of an area where a polygon is drawn, isosceles sides, and a base to be connected to form the outline of the polygon, a centerline which is drawn from the vertex as a start point to a point bisected with the base and set as an indicator axis;
   generating similar figures to the base graphics, each of the graphics having the vertical angle of 2π/N and an area representing an item value of the allocated evaluation item, as item-value-corresponding graphics; and
   drawing a polygonal chart made of all the item-value-corresponding graphics arranged in a radial pattern by placing each of the vertexes to be overlapped at the center point of an area and by connecting adjacent bases together to form the outline of the polygon.

2. The polygonal chart drawing processing method according to claim 1, further comprising:
   storing base graphics with different shapes of bases or isosceles sides in a graphic storing unit and
   obtaining a base graphic selected from the graphic storing unit by user's designation.

3. The polygonal chart drawing processing method according to claim 1, comprising:
   accepting user input for designating either of a radar chart or a polygonal chart as a chart representing the drawing object;
   drawing a radar chart representing relationship among respective item values of the evaluation items for the drawing object; and
   if designation of a polygonal chart is accepted as user input for designating either of the radar chart or the polygonal chart, the inputting item values of the evaluation items inputs evaluation items set for a drawing object and item values of the evaluation items.

4. A polygonal chart drawing processing device for drawing a polygonal chart representing relationship among evaluation values of each evaluation item for drawing objects, for which at least three evaluation items set, the device comprising:
   a data input unit for inputting evaluation items set for a drawing object and item values for the evaluation items;
   a base graphic setting unit for generating base graphics, each of the basic graphics has a vertical angle allocated based on the number of the evaluation items N at a vertex overlapped at the center point of an area where a polygon is drawn, isosceles sides, and a base to be connected to form the outline of the polygon, a centerline which is drawn from the vertex as a start point to a point bisected with the base and set as an indicator axis;
   an item-value-corresponding graphics generating unit for generating similar figures to the base graphics, each of the graphics having the vertical angle of 2π/N and an area representing an item value of the allocated evaluation item, as item-value-corresponding graphics; and
   a polygonal chart drawing unit for drawing a polygonal chart made of all the item-value-corresponding graphics arranged in a radial pattern by placing each of the vertexes to be overlapped at the center point of an area and by connecting adjacent bases together to form the outline of the polygon.

5. The polygonal chart drawing processing device according to claim 4, further comprising:
   a base graphic storing unit for storing base graphics with different shapes of bases or isosceles sides; and
   a base graphic setting unit for obtaining a base graphic selected from the base graphic storing unit by user's designation.

6. The polygonal chart drawing processing device according to claim 4, further comprising:
   a chart selecting unit for accepting user input for designating either of a radar chart or a polygonal chart as a chart representing the drawing object;
   a radar chart drawing unit for drawing a radar chart representing relationship among respective item values of the evaluation items for the drawing object; and
   wherein, if designation of a polygonal chart is accepted at the chart selecting unit, the data input unit inputs evaluation items set for a drawing object and item values of the evaluation items.

7. A computer-readable recording medium storing a polygonal chart drawing program for causing a computer to function as a processing device comprising:
   a data input unit for inputting evaluation items set for a drawing object and item values of the evaluation items;
   a base graphic setting unit for generating base graphics, each of the basic graphics has a vertical angle allocated based on the number of the evaluation items N at a vertex overlapped at the center point of an area where a polygon is drawn, isosceles sides, and a base to be connected to form the outline of the polygon, a centerline which is drawn from the vertex as a start point to a point bisected with the base and set as an indicator axis;
   an item-value-corresponding graphics generating unit for generating similar figures to the base graphics, each of the graphics having the vertical angle of 2π/N and an area representing an item value of the allocated evaluation item, as item-value-corresponding graphics; and
   a polygonal chart drawing unit for drawing a polygonal chart made of all the item-value-corresponding graphics arranged in a radial pattern by placing each of the vertexes to be overlapped at the center point of an area and by connecting adjacent bases together to form the outline of the polygon.

8. The computer readable recording medium storing a polygonal chart drawing program according to claim 7, for causing the computer to function as a processing device further comprising:
   a base graphic storing unit for storing base graphics with different shapes of bases or isosceles sides; and a base graphic setting unit for obtaining a base graphic selected from the base graphic storing unit by user's designation.

9. The polygonal chart drawing program according to claim 7 for causing the computer to function as a processing device further comprising:

a chart selecting unit for accepting user input for designating either of a radar chart or a polygonal chart as a chart representing the drawing object; and a radar chart drawing unit for drawing a radar chart representing relationship among respective item values of the evaluation items for the drawing object; and wherein, if designation of a polygonal chart is accepted at the chart selecting unit, the data input unit inputs evaluation items set for a drawing object and item values of the evaluation items.

* * * * *